(No Model.)

F. L. SIEGEL.
BOTTLE STOPPER.

No. 581,522. Patented Apr. 27, 1897.

Witnesses

Inventor
Frederick L. Siegel
By Attorneys

United States Patent Office.

FREDERICK LUDWIG SIEGEL, OF ATLANTA, GEORGIA.

BOTTLE-STOPPER.

SPECIFICATION forming part of Letters Patent No. 581,522, dated April 27, 1897.

Application filed May 5, 1896. Serial No. 590,262. (No model.)

*To all whom it may concern:*

Be it known that I, FREDERICK LUDWIG SIEGEL, of Atlanta, in the county of Fulton and State of Georgia, have invented certain new and useful Improvements in Bottle-Stoppers; and I do hereby declare the following to be a full, clear, and exact description of the invention, such as will enable others skilled in the art to which it appertains to make and use the same.

This invention contemplates certain new and useful improvements in bottle-stoppers, having reference to that class employing valves to prevent the refilling of a bottle after the same has been once emptied, thus preventing the bottle from being used a second time for liquid of an inferior or different quality from that originally contained in the bottle.

The object of the invention is to provide an extremely simple and inexpensive stopper which is capable of being easily inserted within a bottle-neck. This I accomplish by providing a casing having upper and lower tubular portions surrounded by cork rings and a central bulged portion in which is located a transverse partition to limit the movement of a ball-valve and prevent the insertion of a wire or the like for controlling said valve. The casing is preferably formed in two parts united by a threaded joint at the center of the bulged portion.

The invention will be hereinafter fully set forth, and particularly pointed out in the claim.

Figure 1:
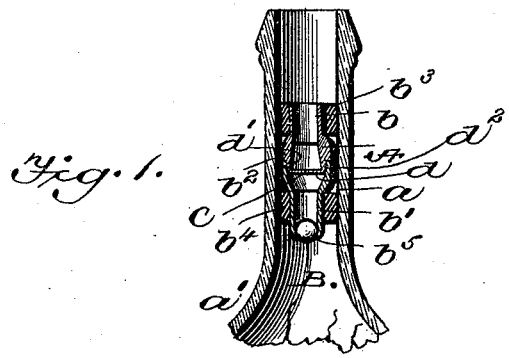
Figure 2:
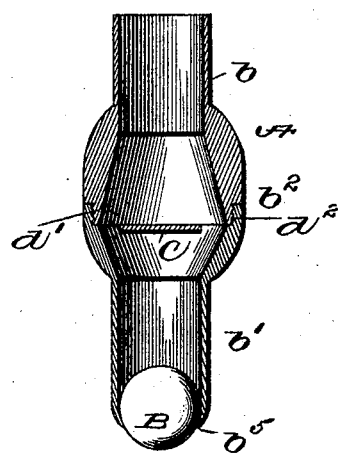
Figure 3:
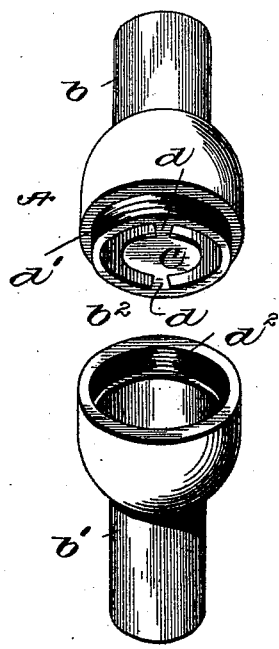

In the accompanying drawings, Figure 1 is a vertical sectional view showing a portion of a bottle provided with my improved stopper. Fig. 2 is an enlarged view of the latter removed. Fig. 3 shows the two parts of the casing separated.

Referring to the drawings, A designates a valve-casing located within the cylindrical neck $a$ of a bottle $a'$. This casing is formed with upper and lower tubular or cylindrical portions $b$ $b'$ and an intermediate bulged portion $b^2$. Surrounding the tubular or cylindrical portions are cork rings $b^3$ $b^4$, which fit snug within the neck $a'$ of the bottle and serve to securely hold the casing locked therein. The bulged portion $b^2$ is designed to fit the interior of the bottle-neck and also form firm seats for the cork rings $b^3$ $b^4$. Said bulged portion also serves to increase the strength of the casing at the points where the two parts thereof are united together.

B designates the ball-valve, movable in the lower portion of casing $a$, its downward movement being limited by an inwardly-extended circumferential flange $b^5$, while its upward movement is arrested by a horizontally-located plate or partition C, which is of circular form and held away from the bulged portion of the casing, save by two lateral arms $d$, which connect it to the interior of the latter, thus leaving a space surrounding the partition to allow of the passage of the liquid. The casing is formed in two parts, the upper part having a reduced exteriorly-threaded flange $d'$, which engages a female thread $d^2$ on the interior of the lower part. The plate or partition C is preferably formed with the upper part $d'$ in line with the lower end of the latter.

The advantages of my invention are apparent to those skilled in the art to which it appertains. It will be noted that the same is exceedingly simple and can be manufactured at a very slight cost. In practice by tilting the bottle the ball-valve will fall away from its lower seat and pass into the bulged portion of the casing, allowing of the free outflow of the liquid, the movement of the valve being limited by the plate or partition. When the bottle is again righted, the valve will be reseated. Surreptitious control of the valve is prevented by the plate or partition.

I claim as my invention—

The herein-described bottle-stopper comprising a hollow casing formed in two parts, each having a cylindrical end and an enlarged bulged portion, said latter portions being removably connected together, and designed to fit snugly against the inner surface of a bottle-neck, a plate located in said casing at or near the point of union of the parts thereof having a surrounding passage-way, cork rings encircling the said cylindrical ends of said casing, said rings being designed to fit against the inner surface of the bottle-neck, said lower cylindrical end having its extreme edge flanged inward, and a ball-valve movable in said lower cylindrical portion, substantially as set forth.

In testimony whereof I have signed this specification in the presence of two subscribing witnesses.

FREDERICK LUDWIG SIEGEL.

Witnesses:
JAS. MAYSON,
J. C. MOORE.